(12) United States Patent
Reischmann et al.

(10) Patent No.: US 10,645,961 B2
(45) Date of Patent: May 12, 2020

(54) CONTROLLER FOR POPCORN POPPER

(71) Applicant: Kenyon Technologies, LLC, Key Largo, FL (US)

(72) Inventors: Michael Reischmann, Eustis, FL (US); Edward Gilchrest, Oxford, CT (US); Andrew Krystinik, Middlefield, CT (US); Craig Bures, Prospect, CT (US)

(73) Assignee: Kenyon Technologies, LLC, Key Largo, FL (US)

( * ) Notice: Subject to any disclaimer, the term of this patent is extended or adjusted under 35 U.S.C. 154(b) by 0 days.

(21) Appl. No.: 16/291,340

(22) Filed: Mar. 4, 2019

(65) Prior Publication Data

US 2019/0269159 A1    Sep. 5, 2019

Related U.S. Application Data (60) Provisional application No. 62/637,716, filed on Mar. 2, 2018.

(51) Int. Cl.
| | |
|---|---|
| *A23L 7/187* | (2016.01) |
| *A47J 27/00* | (2006.01) |
| *A23L 5/10* | (2016.01) |

(52) U.S. Cl.
CPC ........... *A23L 7/187* (2016.08); *A23L 5/15* (2016.08); *A47J 27/004* (2013.01); *A23V 2002/00* (2013.01)

(58) Field of Classification Search
CPC .......... A23L 7/187; A23L 5/15; A47J 27/004; A23V 2002/00
USPC ....... 219/391, 392, 395, 399, 400, 407, 408, 219/621, 622; 426/113, 231, 233, 438, 426/450, 462, 523, 534, 618, 625, 640; 99/323.5, 323.6, 323.7, 323.8, 323.9,
(Continued)

(56) References Cited

U.S. PATENT DOCUMENTS

| | | |
|---|---|---|
| 9,084,504 B2 | 7/2015 | Reischmann |
| 9,848,729 B2 | 12/2017 | Reischmann |
| 10,098,370 B2 | 10/2018 | Reischmann |

(Continued)

OTHER PUBLICATIONS

U.S. Appl. No. 13/317,958, filed Nov. 1, 2011.
U.S. Appl. No. 13/589,681, filed Aug. 20, 2012.

*Primary Examiner* — Phuong T Nguyen
(74) *Attorney, Agent, or Firm* — St. Onge Steward Johnston & Reens, LLC (57) ABSTRACT

A popcorn popper configured to cook popcorn includes a vessel and an electric heating element which heats the vessel. A vibration element vibrates the vessel and a controller controls the heating element and the vibration element. A temperature sensor is in communication with the controller such that the controller can receive temperature readings from the temperature sensor indicative of a temperature of the vessel. The controller activating the heating element to heat the vessel which contains the popcorn until the temperature sensor indicates that a first temperature has been reached. The controller, based on readings from the temperature sensor, maintains the vessel at a second temperature by controlling a power setting of the heating element and the controller activates the vibration element to vibrate the vessel which thereby vibrates the popcorn. The controller after maintaining the vessel at the second temperature, reduces the power of the heating element.

22 Claims, 7 Drawing Sheets

(58) Field of Classification Search
USPC .... 99/323.11, 332, 353, 401, 419, 420, 426, 99/443, 447, 448
See application file for complete search history.

(56) References Cited

U.S. PATENT DOCUMENTS

2013/0105468 A1* 5/2013 Reischmann ........... A47J 27/00
219/621
2016/0374377 A1 12/2016 Reischmann

* cited by examiner

CONTROLLER FOR POPCORN POPPER

FIELD OF THE INVENTION

The following relates to a method for controlling and measuring the cooking process for popcorn and a device for cooking popcorn. Preferably, the device provides for dedicated cooking of popcorn in an efficient, economical and easy to use manner that avoids burning.

BACKGROUND OF THE INVENTION

A number of popcorn popping machines exist as do microwaveable bags to pop the corn. Certain devices utilize hot air directed at the popcorn kernels to cause them to pop. Often times, these devices do not allow for cooking in cooking fats such as oil and the like and furthermore, these devices often require seasoning to be added after cooking rather than the kernels being cooked in the oil and seasoning. Thus, some devices can result in a rather bland taste to the popcorn.

Although a simple cooking method may involve placing a pot of kernels on a stove with oil and seasoning, this requires the user to monitor and adjust the heat to avoid burning. Particularly, as the popcorn pops it becomes more susceptible to burning, but at the same time, the un popped kernels still need to be popped as they are not generally considered edible in the un popped phase.

Thus, a delicate balance between heating and popping is required which means the individual who wants to eat popcorn has to watch and listen to the pot carefully to avoid burning. Furthermore, measuring the appropriate amount of popcorn and balancing with the appropriate amount of oil and/or seasoning can be a challenge to provide consistent results.

A similar deficiency exists in microwave bag popcorn. Basically, the power of different microwaves can vary drastically and the user is required to set the timer and monitor the popping sound to ensure that the microwave is not on too long after popping is finished. If the user is not careful, the popcorn can burn, resulting in waste.

SUMMARY OF THE INVENTION

It is therefore an object of the invention to provide an easy to use popcorn popper which efficiently and easily cooks a desired amount of popcorn while avoiding burning.

It is a further object to provide for cooking of popcorn in oils/fats and/or seasoning without the difficulty of monitoring cooking or adjustments or use of cooking skill by the user.

Yet another object is to provide for a popcorn cooker which adjusts its settings based on incoming voltage variances to ensure consistent popping results.

Yet another object is to provide for fast cooking time for a particular serving size of popcorn without burning the popcorn and while popping as much of the kernels as possible.

Still a further object is to provide an easy to use and automated cartridge and popper system that produces a pre-measured amount of popcorn.

A further object is to provide for a single serving pre-measured cooking cartridge for popcorn.

These and other objects are achieved by providing a popcorn cooker which heats a vessel which contains popcorn kernels utilizing a heating element. A controller controls the heating element and a vibration element, the vibration element when activate vibrates the vessel, thereby vibrating the popcorn kernels. The controller based on temperature readings from a temperature sensor adjusts a power setting of the heating element and adjusts the vibration element to efficiently cook popcorn. The controller is programmed in certain embodiments to rapidly approach a first temperature and then more slowly approach a second temperature which may be a range. The second temperature is then maintained as the popcorn pops. As kernels pop, they are directed out of the vessel towards a container, resulting in less mass in the vessel which needs to be heated and consequently, the power required to maintain the second temperature will tend to reduce as the popcorn pops. At a certain point, most of the popcorn has popped and there is enough residual heat in the vessel to pop the remaining kernels and the heating element is turned off. The vibration element is activated at this stage more frequently in case there are popped kernels remaining in the vessel as the vibration tends to make burning less likely. While the second temperature is being maintained, the vibration element may be activated as well including by turning the vibration on and off.

In certain aspects, a method of cooking popcorn using a popcorn popper is provided and includes one or more of the steps of: activating a heating element via a controller to bring a cooking temperature for the popcorn to a first temperature; maintaining a temperature at least as high as said first temperature using the controller which controls a power setting of the heating element, said maintaining based on readings from a temperature sensor; vibrating the popcorn during the maintaining step with a vibration element activated by the controller; and reducing the power setting of the heating element with the controller after expiration of the period of time.

In certain aspects during the maintaining step, power required of the heating element to maintain said temperature reduces as popcorn pops and the reducing step happens based on a threshold rate change in power required to maintain said temperature being reached. In other aspects the maintaining step is done for a period of time which once expired, the reducing step begins. In other aspects the period of time is pre-determined. In still other aspects the period of time is determined based on an indication of a cooking vessel type which contains un-popped kernels of the popcorn. In other aspects the first temperature is reached the power setting of the heating element is reduced, allowing the temperature of the maintaining step to be reached between the activating and maintaining step at a smaller rate change in temperature as compared to a rate change in temperature prior to the activating step.

In other aspects a popcorn popper which is configured to cook popcorn is provided including a vessel and a heating element which is electrically powered and which when activated heats the vessel. A vibration element vibrates the vessel. A controller which controls the heating element and the vibration element. A temperature sensor which is in communication with the controller such that the controller can receive temperature readings from the temperature sensor indicative of a temperature of the vessel. The controller activates the heating element to heat the vessel which contains the popcorn until the temperature sensor indicates that a first temperature has been reached. The controller, based on readings from the temperature sensor, maintains the vessel at a second temperature by controlling a power setting of the heating element. The controller activates the vibration element to vibrate the vessel which thereby vibrates the popcorn. The controller after maintaining the vessel at the second temperature, reduces the power of the heating element.

In certain aspects the controller reduces the power of the heating element to allow for the vessel to reduce in temperature based on one or more of the group consisting of: a reading from the temperature sensor, a expiration of a time period, and reaching a threshold rate change in power required to maintain the second temperature. In other aspects a first power setting to reach the first temperature is higher than a second power setting to reach the second temperature such that a first rate change of temperature prior to reaching the first temperature is higher than a second rate change of temperature after reaching the first temperature. In certain aspects the second temperature is a range of temperatures. In certain aspects the controller reduces the power setting based on a period of time elapsing after the first temperature has been reached.

In other aspects the controller reduces the power setting based on a rate change in power required for the maintaining step. In other aspects, during the maintaining step, the controller cycles the heating element on and off at least twice. In still other aspects, the rate change in power required for the maintaining is based on an average power. In other aspects the second temperature is a range of temperatures. In other aspects, the first temperature is a range of temperatures. In other aspects, the vibration element is switched between a cycle of activated and deactivated at least twice during the time period.

In other aspects, the power setting is reduced when that power setting required to maintain the second temperature reduces. In still other aspects the power setting is reduced when that power setting required to maintain the second temperature reduces below a threshold value. In other aspects, the first and second temperatures are equal. In other aspects, after the controller reduces the power setting of the heating element, the vibration element is activated. In other aspects, the vessel includes a ferrous material and the heating element includes an induction coil. In other aspects the vessel is a cartridge comprising a ferrous and a non-ferrous material, the ferrous material in contact with the popcorn which is in the cartridge.

In other aspects the controller determines an incoming voltage of an electrical power source to which the popcorn popper is connected and based on determining the incoming voltage adjusts a setting of the heating element to compensate for varied voltage sources. In still other aspects, the controller utilizes temperature readings taken when the vibration element is deactivated.

In other aspects, a popcorn popper which is configured to cook popcorn is provided including a vessel and a heating element which is electrically powered and which when activated heats the vessel. A vibration element vibrates the vessel and a controller controls the heating element and the vibration element. A temperature sensor is in communication with the controller such that the controller can receive temperature readings from the temperature sensor indicative of a temperature of the vessel. A selector is in communication with the controller to activate the popcorn popper. Software executes on the controller which upon receiving a selection from the selector activates the heating element to heat the vessel which contains the popcorn until the temperature sensor indicates a temperature is reached. The software, based on readings from the temperature sensor, maintains the vessel at or within a range of the temperature by controlling a power setting of the heating element. The software while the temperature is maintained, activates the vibration element to vibrate the vessel which thereby vibrates the popcorn. The software thereafter vibrates the vessel and simultaneously reduces the power of the heating element which allows the vessel to reduce in temperature.

In certain aspects, when vibrating and simultaneously reducing the power, the power is reduced to off.

Unless otherwise stated, all temperature values described herein refer to degrees Fahrenheit and one of skill in the art would understand how to convert to other units.

Other objects of the invention and its particular features and advantages will become more apparent from consideration of the following drawings, claims and accompanying detailed description.

DETAILED DESCRIPTION OF THE INVENTION

Referring now to the drawings, wherein like reference numerals designate corresponding structure throughout the views. The following examples are presented to further illustrate and explain the present invention and should not be taken as limiting in any regard.

Certain features of a cooking system and popcorn cooker are disclosed in U.S. application Ser. Nos. 13/317,958; 13/666,674; 13/589,681; 14/701,203; 14/701,227; 15/192,573, the content of the foregoing and their associated publications are incorporated by reference herein.

Figure 1:
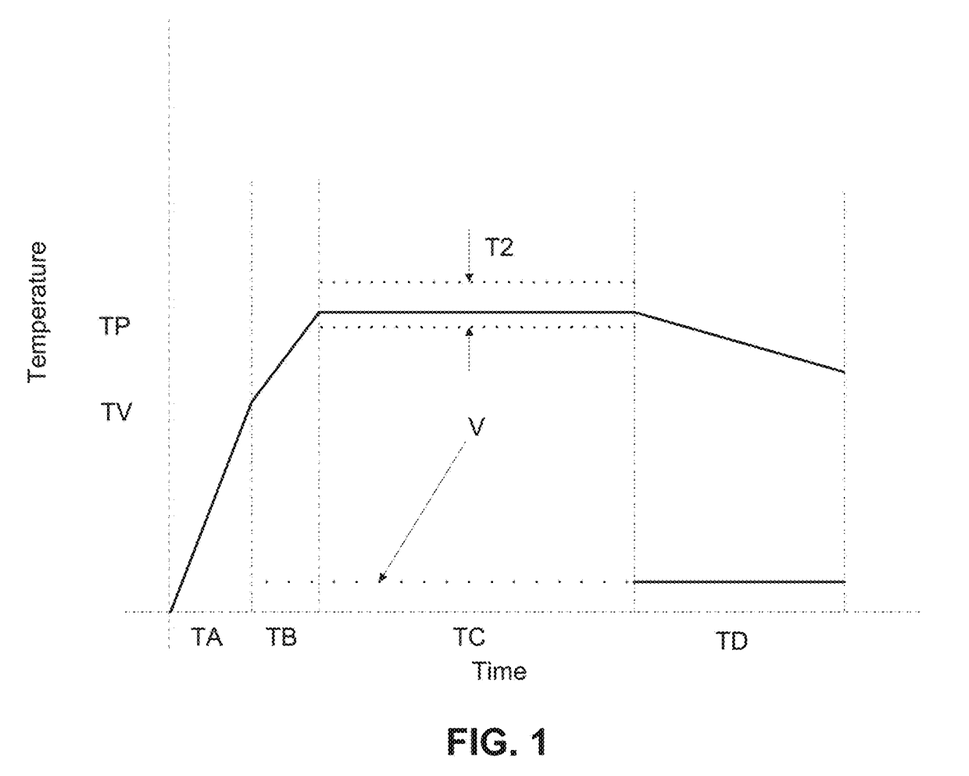
FIG. 1 is a graphical representation of an exemplary time/temperature and vibration cooking cycle of the popcorn popper according to the present invention.

Referring to FIG. 1 an exemplary cooking cycle is shown on a time/temperature plot and showing vibration V. The temperature readings are measured by a temperature sensor and communicated to a controller as shown in other figures. The basic goal of the cooking cycle is to heat the kernels as quickly as possible to start popping and then while popping avoid burning during continuous cooking. The vibration cycle tends to agitate the kernels and cooking vessel in a way that results in a temperature reduction due to increased heat transfer away from the vessel/kernels. Thus, the vibration may actually slow the cooking process or the rate at which the temperature initially increases during TA and/or TB or at other points may require power to be delivered to the cooking element at a higher rate than if vibration was deactivated. However, the vibration also allows for the kernels to be mixed and distributed and turned to avoid burning. Furthermore, the vibration assists in inhibiting popped kernels from burning. The lid of the cooker is designed to direct popped kernels into the receiving vessel/cup. However, in some cases, the popcorn tends to pop and scatter in a variety of somewhat unpredictable directions. In order to avoid over cooking/burning of those kernels which do not exit the vessel after popping, vibration is used to avoid or reduce the tendency to burn/overcook those kernels which pop but do not make it out of the vessel. However, at the end of the process, the un-popped kernels and the remaining oil is separated from the popped corn with the un-popped kernels remaining in the vessel, which may be the re-usable pan or the cartridge.

The vibration cycle V is shown as the dashed and solid lines of FIG. 1. The dashed lines represent the vibration cycle turning on and off such that between the black dashes/dots, the motor which drives the vibration cycle is at rest. The solid line for the vibration cycle V represents continuous vibration. It is understood that the frequency of the vibration cycle when the vibration cycle is active may be varied depending on required cooking parameters. As shown in FIG. 1, the temperature is increased from the starting temperature towards TV in a rapid manner. In the example shown in FIG. 1, the initial temperature increase during TA does not employ vibration. This is done to minimize time to reach the cooking temperature TP. In certain embodiments TP may be approximately 400 degrees or in the range of 325-500 or more preferably 350-450 degrees. However, in order to balance the desire to avoid burning the kernels, the vibration cycle may be activated once a particular temperature TV is reached. In certain embodiments TA is less than 1.5 or more preferably less than 1.0 minutes. TV is preferably in the range of 225-325 or more preferably approximately 300 degrees.

Once the temperature sensor indicates that the vessel has reached T1, the vibration cycle may start. In other embodiments, the vibration cycle may start from the beginning. As can be seen, during TB and TC, the vibration cycle alternates between activated and deactivated. This is done to provide for mixing/turning of the kernels but to also reduce the power requirements which would typically be greater when the vibration extends for longer intervals if activation thereof was continuous. In some preferred embodiments, the vibration cycle alternates from on/active for 1-4 seconds or more preferably 1.5-3.5 seconds and then off/deactivated for 2-8 seconds or more preferably 3-7 seconds. In certain preferred embodiments, the on time is approximately 2 seconds and the off time is approximately 5 seconds. This cycle may repeat multiple times, for example at least 5 times, preferably at least 15 times and even more preferably at least 20 times. This cycle is repeated multiple times during TB and TC as shown and in some cases also repeated during TA and TD.

As shown during TB, the vibration is turned on in the cycling fashion and this results in the rate of temperature increase to be less than that of TA. In addition, the power setting may be reduced once TV is reached so that TP is approached more slowly and T2 is not surpassed. Once TP is reached, the vessel is maintained within the range T2 for a period of time TC. T2 may be a range of acceptable temperatures on either or one side of TP. When initially heating, a few kernels may pop during TA and more may pop during TB. The majority of the popping of the kernels occurs during TC and then as fewer un popped kernels remain, the risk of burning a kernel which remains in the vessel begins to increase. Therefore, the heating element may be turned off or reduced in power to allow for the temperature to slowly drop as shown during TD. Also during this time period, the vibration cycle V may be come continuous to further reduce the risk of burning popped kernels which did not deflect into the container and remain in the vessel. At the end of TD, the popper may beep or present another audible or visual cue that popping is done. At this stage, the vessel can be emptied of popped kernels and the user can enjoy the freshly cooked popcorn in the container/cup 32.

Figure 2:
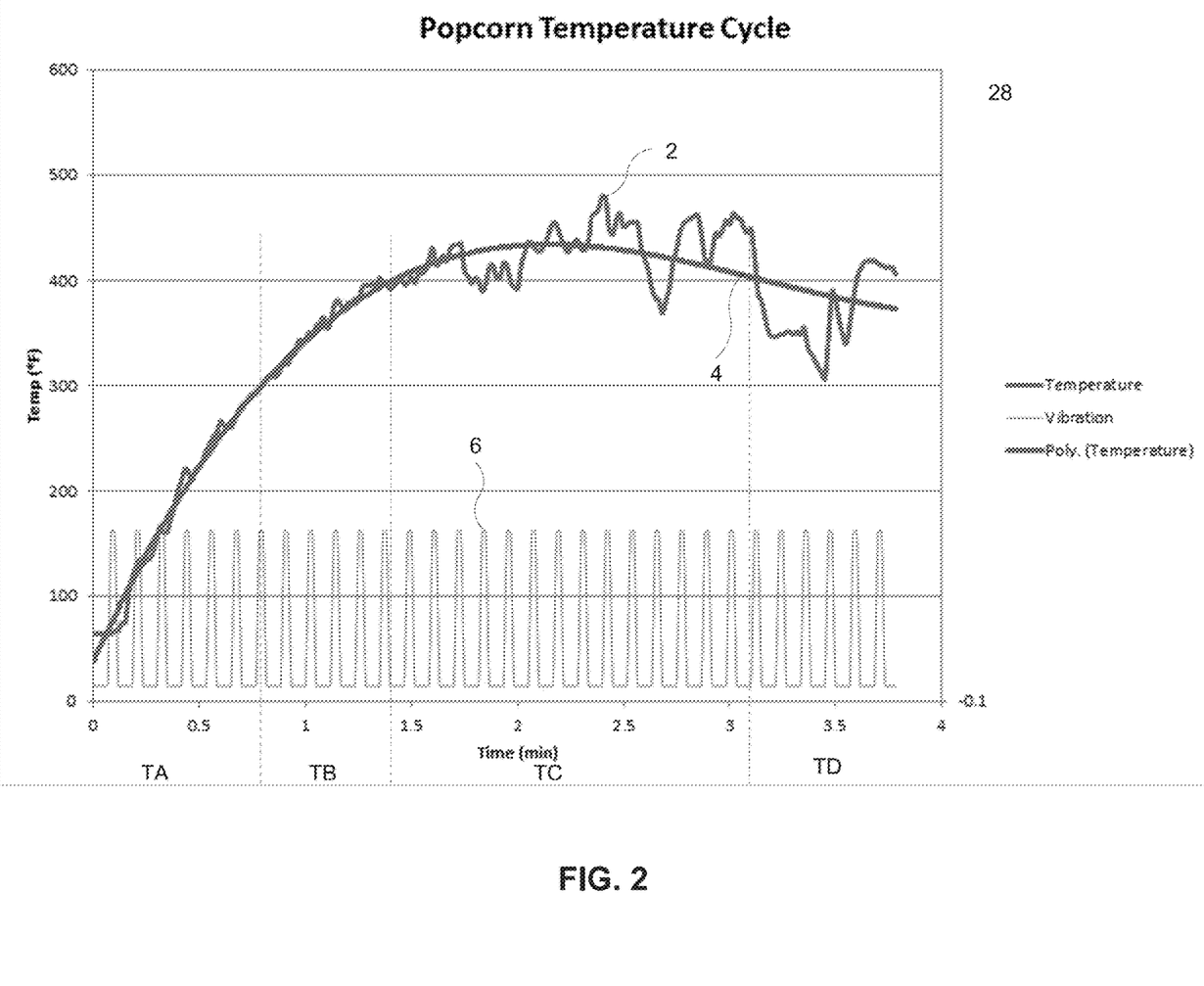
FIG. 2 is another exemplary time/temperature and vibration cooking cycle of the popcorn popper according to the present invention.

FIG. 2 shows actual experimental results of temperature and time readings for one exemplary cooking cycle according to FIG. 1. In this embodiment, the vibration cycle is 2 seconds on and 5 seconds off in a continuous manner throughout the cooking cycle. The peaks of the vibration cycle 6 represent the motor/vibration element being on whereas the valleys show the motor/vibration element being off.

The temperature sensor and vessel are typically separate elements in the sense that the vessel can be removed from the device for cleaning or if the vessel is a cartridge so that the vessel can be discarded. Thus, a flexible cavity is provided in the popcorn popper to receive the vessel and the temperature sensor is connected to the flexible cavity. The temperature sensor would then read the temperature of the material which makes up the cavity (preferably silicone) or the temperature sensor may contact the vessel to read direct temperature. If the temperature sensor does not directly contact the vessel, a conversion factor or relationship may be used to convert temperature readings to actual temperatures experienced inside the vessel. In this manner, the temperature of the vessel can be inferred from the temperature readings from the sensor. The temperature curve in FIG. 2 shows measured 2 and approximated temperatures 4. As can be seen, there are wide fluctuations in temperature readings which result from the vibration cycle being active and the sensor loosing contact with the vessel or the material in which the temperature sensor is embedded loosing contact with the sensor. Therefore, the controller can be configured to read the temperature at points where the vibration element/motor is off to ensure improved accuracy. For example, during the 5 approximately second deactivated/off period of one preferred embodiment described above.

Referring to FIG. 2, the temperature is increased rapidly towards 300 degrees during TA. In this embodiment, the maximum power setting for the heating element may be used. Once 300 degrees is reached, the power setting may be reduced during TB so that TP (400 degrees in this example) is less rapidly approached. This avoids problems with shooting too far past the desired cooking temperature for optimal popping (e.g. TP). In some embodiments, the high power setting may be maintained after TV (300 degrees in this example) is reached but reduced closer to TP. During TC, the power setting is varied or the heating element is turned on and off to maintain the temperature in a range near the desired cooking temperature. As shown in FIG. 2 this range is approximately 400-425 degrees.

Referring to FIG. 2, the greatest fluctuations in measured temperature occur during TC mainly because the power setting of the heating element is being modified, the kernels are being vibrated and this vibration results in inconsistent readings of the temperature setting. In embodiments where the temperature reading is captured between vibration cycles, the actual temperature curve may be closer to the flat line depiction of FIG. 1, or for example that the temperature curve would be maintained at a smaller range of temperatures.

As TD is reached, it would be expected that fewer and fewer un-popped kernels would remain in the vessel. This in turn would require less power to maintain the desired cooking temperature. Therefore as the power setting reduces either to a particular pre-defined setting or the power setting beings reducing at a particular rate, the controller would know that cooking is nearly finished and that the residual heat in the vessel can be used to pop any remaining popcorn.

As has also been described, during TD and in fact towards the end of TC, the risk of burning popped kernels begins to increase. Therefore, it is desirable to begin to reduce the temperature and to at the same time continue to vibrate the vessel. The vessel may continue to be vibrated in the 2 on and 5 off exemplary cycle or other cycles described herein may be used. In certain embodiments, a continuous on cycle is used beginning at TD (See FIG. 1). During TD, the power to the heat element is either off or greatly reduced and the remaining un popped kernels may be cooked by the residual heat remaining in the vessel. The combination of vibration and reduced or off power settings allows for finishing of the popping cycle while inhibiting burning.

The controller may also include a safety mode which determines based on the power settings required to reach particular temperatures if the lid 30 is not closed. For example, a higher power may be required to get to TV, TP and to maintain T2 if the lid were open. If a variance from the expected power increases past a threshold, the heating element may be turned off. The controller can also zero itself based on initial temperature readings prior to cooking starting such that if cool (for example below 110 or below 100 or below 90 degrees) the initial temperature reading would be expected to be the ambient air temperature. If this ambient temperature were cold, additional power would be expected regardless of if the lid were open or closed. Thus, the threshold could be adjusted based on the initial temperature reading to ensure the popper works in both cold and warm ambient temperatures. At the same time, if ambient temperature is cold and multiple servings of popcorn are made one after the other, the initial temperature reading on the second cycle through would likely be higher than the actual ambient temperature such that modifying the threshold would not be indicated. The controller can therefore compare timing to an internal clock and expected drop in residual temperature after cooking to determine if the initial temperature reading is in fact indicative of the ambient temperature.

Figure 3:
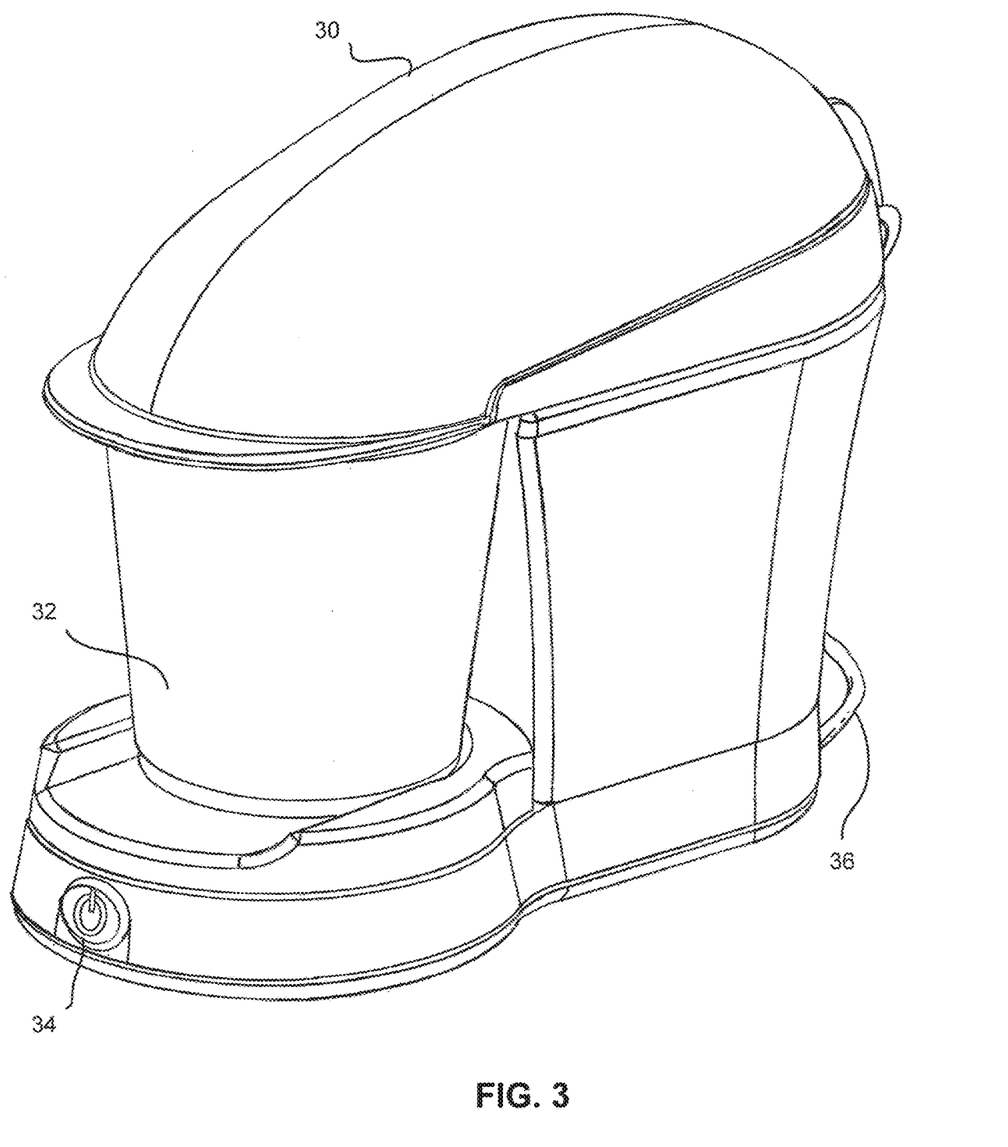
FIG. 3 is a perspective view of the popcorn popper which implements the cooking cycle of FIGS. 1 and/or 2.
Figure 4:
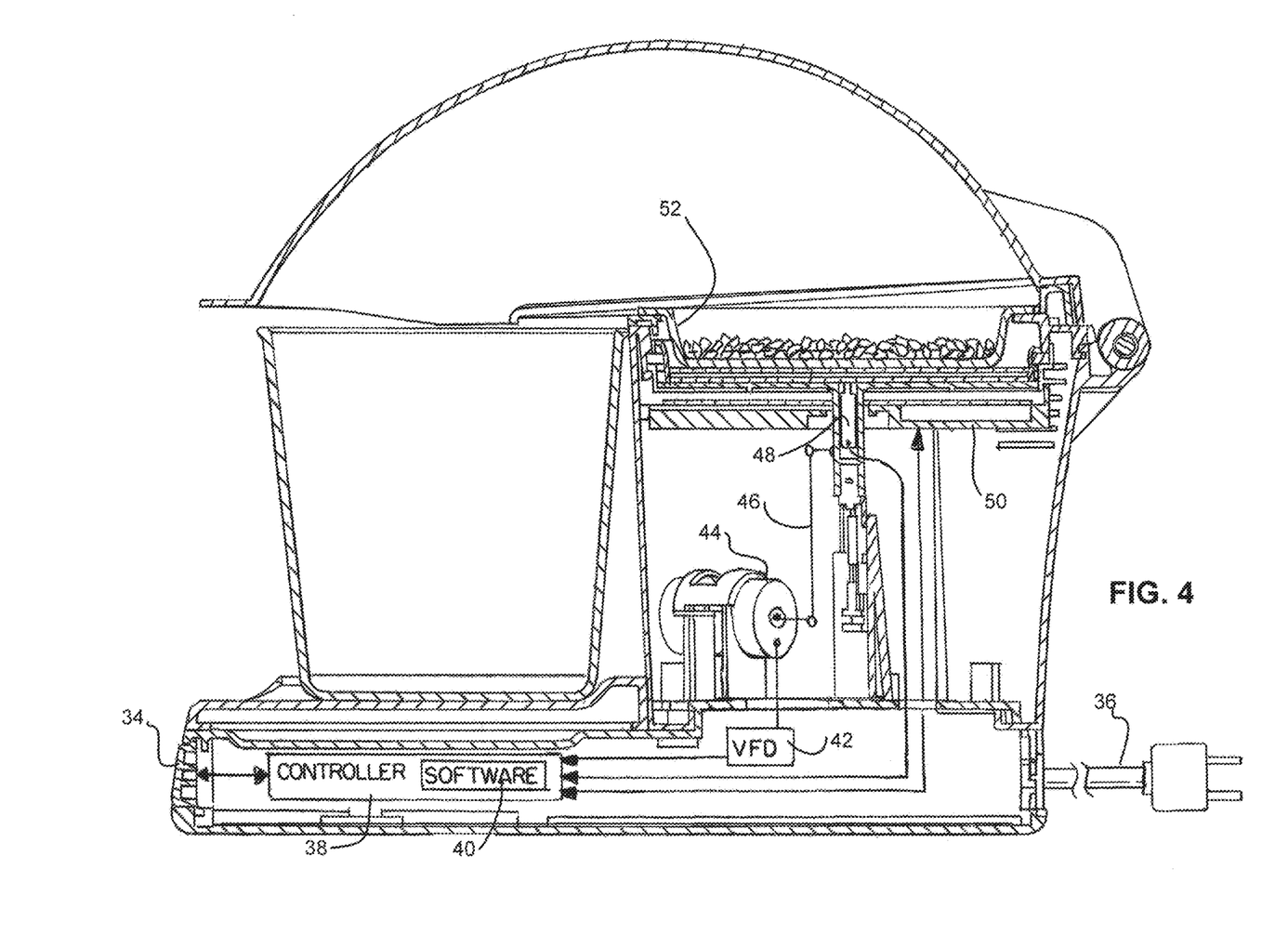
FIG. 4 is a side cutaway view of the popcorn popper according to FIG. 3.
Figure 5:
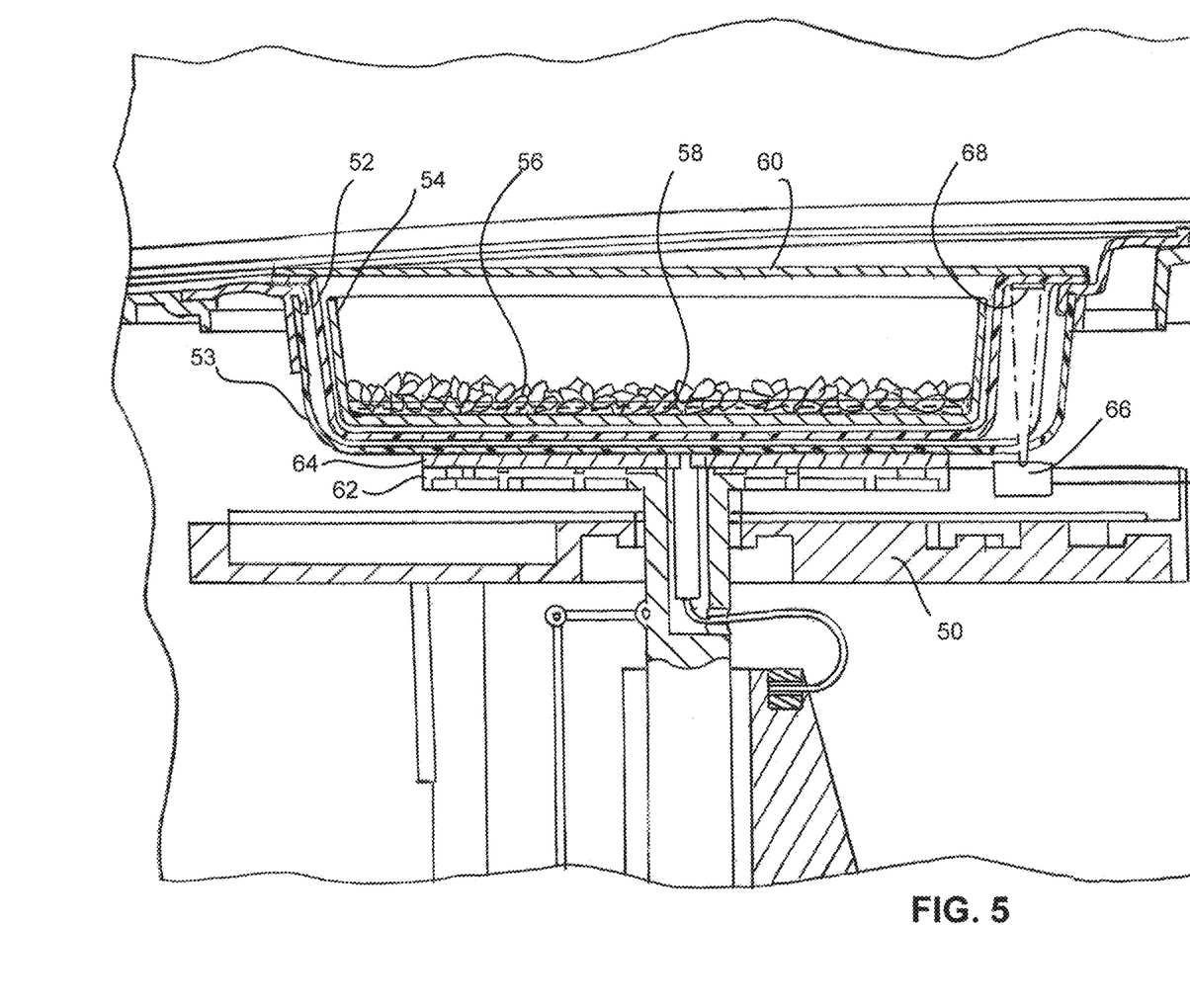
FIG. 5 is a detail side cutaway view of the popcorn popper according to FIG. 3.
Figure 6:
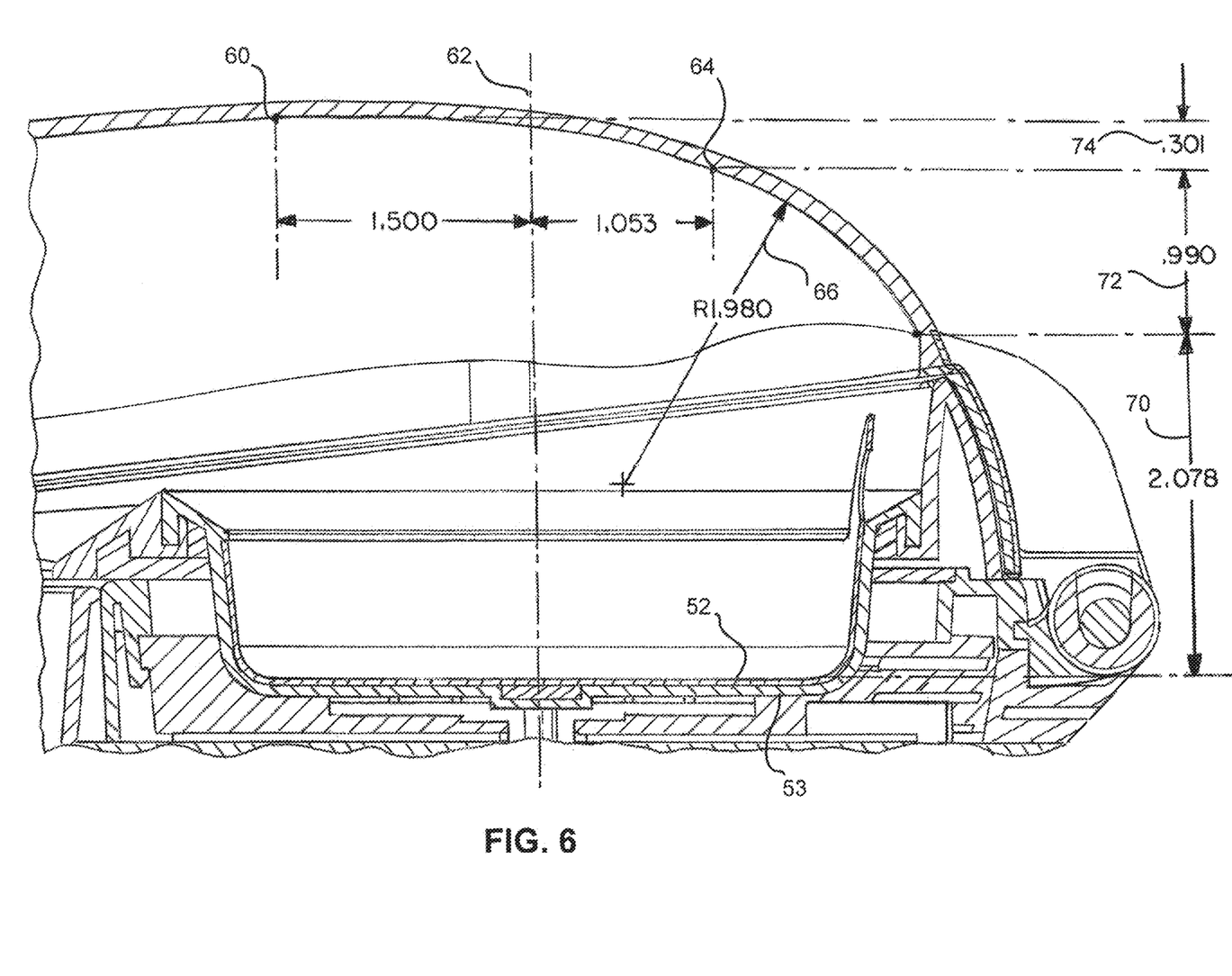
FIG. 6 is a side detail view of the popcorn popper according to FIG. 3.

Referring to FIGS. 3-5, the popcorn popper is provided with a curved lid which may be transparent. FIG. 6 shows certain dimensional parameters of one embodiment of the lid.

The popper is provided with a button 34 which turns it on/off. A one button operation may be used and the button may turn different colors depending on the mode. For example, the button may be pressed once to turn the machine on and then pressed again to start the popping/heating cycle. Once finished, the button may turn a different color and/or the machine may beep or provide some other signal that cooking is finished. FIG. 4 shows a reusable pan which may be stainless steel which allows the user to add their own oil, popcorn and seasoning to the vessel for cooking. The vessel may be provided with a fill line to ensure accurate filling of the vessel. One or more cups may be provided for correct measuring of oil/cooking fat and/or popcorn. FIG. 5 shows a cartridge 52 which includes a metal layer 54 which may include a ferrous material. The interior surface of the cartridge may alternately be coated with a ferrous coating or a metalized paper may be used. The metal material selected must react to the induction coil 50 to produce heat. The vessel sits in a flexible receiver 53 which may be made of a material such as silicone.

The controller 38 has software 40 which executes thereon the controller may include a computer processor and memory. The controller is connected to the button/actuator 34 to enable the user to turn on/off and start the popping cycle. The controller is also connected to the power source 36, the motor 44, the heating element 50 and the temperature sensor 48.

In certain embodiments, the controller is also connected to reader 66 which can read a barcode or other indicator 68 from the vessel. Exemplary vessels include metal pans and cartridges made of a combination of materials. The barcode allows the controller to recognize which type of vessel is inserted into the machine and select the appropriate cooking cycle. For example, when an all stainless steel vessel as shown in FIG. 4 is used, the higher content and weight of ferrous material would be expected to react differently to power settings. In addition, the stainless steel being generally heavier than the cartridge may retain more heat and thus require a different cooking cycle. As shown, the ferrous material 54 in the cartridge 52 is also to include sidewalls. In certain embodiments a generally flat disc may be used. Each variance in the weight, dimensions and material of the ferrous material would be expected to have an impact on the reaction to the induction coil and therefore the cooking. Therefore, the controller may have a number of different control parameters thereon which are selected based on the reading from the reader 66 so that the appropriate cooking cycle is selected for the particular vessel. The cartridge in FIG. 5 is shown with a foil lid 60 thereon and it is understood that this is preferably removed prior to cooking.

The incoming voltage from the power source 36 (such as a home plug) may vary substantially in voltage. First, different countries have different basic voltages such as 120 v or 240 v. Thus, the controller may include the appropriate hardware to adapt the voltage or particular combinations of coils and motors may be used for the different basic voltages of 120 or 240 volts. However, within the basic voltage of 120 v (or for that matter 240 v) there can be varied ranges of actual voltage on the line. This voltage can also be inconsistent depending on location or time of day or other factors which can be unpredictable. Since the power of the induction coil is related to incoming voltage, variances in the voltage would cause the same setting to result in different actual power output, depending on real world conditions. Therefore, a conversion is made by the controller to determine how to modify the power settings for the heat element 50 and settings of the motor 44 to ensure consistent operations. Thus, the controller can determine incoming voltage and then utilize a conversion or calibration to provide for standardized settings when incoming voltage varies. The processor may sense the line voltage in bits and then a power setting is determined by converting bits to a power level in watts based on knowing a conversion between the sensed bits and measured line voltage. In the end a relationship can be determined between the line voltage to which the power source 36 plugs to and the power level. Thus, as a higher voltage means the setting required to output a particular power level is less than if a lower incoming voltage were used. This allows the controller to ensure that the appropriate temperature and time curves are implemented and so that the vibration cycle is activated at correct times. Further, the controller is better able to hold a consistent temperature as the actual heat output and corresponding temperature change is relatively consistent regardless of incoming line voltage.

Referring to FIG. 6, exemplary dimensions of the lid 30 are shown. All dimensions in this figure are in inches unless otherwise stated. The maximum position of the internal surface of the lid 60 is offset with respect to center 62 of the vessel towards the container/cup 32. In the embodiment shown, the vessel has a diameter of approximately 4 inches, particularly, the vessel fits in the silicone/non-metal receiver 53. The offset position 60 is 1.5 inches from the center 62 as shown. The ratio of offset/diameter of the vessel 52 may be in the range of 0.25-1.5 or more particularly 0.25-0.75, even more particularly 0.3-0.6 or more particularly approximately 0.375. The receiver 53 is made of a flexible material to allow for vibration to transfer to the vessel 52. The curve of the inner surface of the lid is shown as being of a constant radius 66 until a flattening point 64. As shown, the radius is 1.98 inches. The ratio of radius 66/diameter of the vessel may be in the range of 0.3-1 or more particularly 0.4-0.8 or more particularly 0.4-0.6 or even more particularly approximately 0.495. The center 68 of the radius 66 is also offset with respect to the centerline 62 away from the container/cup 36. This offset of the radius as shown is approximately 0.2 inches but the ratio of this offset of the radius/diameter of the vessel may be in a range of 0.01-0.1, more particularly in the range of 0.02-0.08, more particularly 0.03-0.07 or this ratio may be approximately 0.05.

The curved surfaces starts at a height 70 over the vessel which is approximately half the diameter of the vessel. And this height 70 is approximately equal to the radius 66. The radius extends from the top of height 70 a distance 72 which is approximately half the height 70 and approximately one quarter the diameter of the vessel 52. At point 64, the curve shallows to the maximum 60 where thereafter the curve directs back downwards towards the container/cup 36. The radius section 66 is steeper than the section between 60 and 64 because popcorn striking the radius surface would need more direction towards the container/cup 36. The shape of the lid 30 ensures that popcorn is more likely to be directed towards the cup 36 than to deflect back into the vessel 52 where burning would become more likely.

Figure 7:
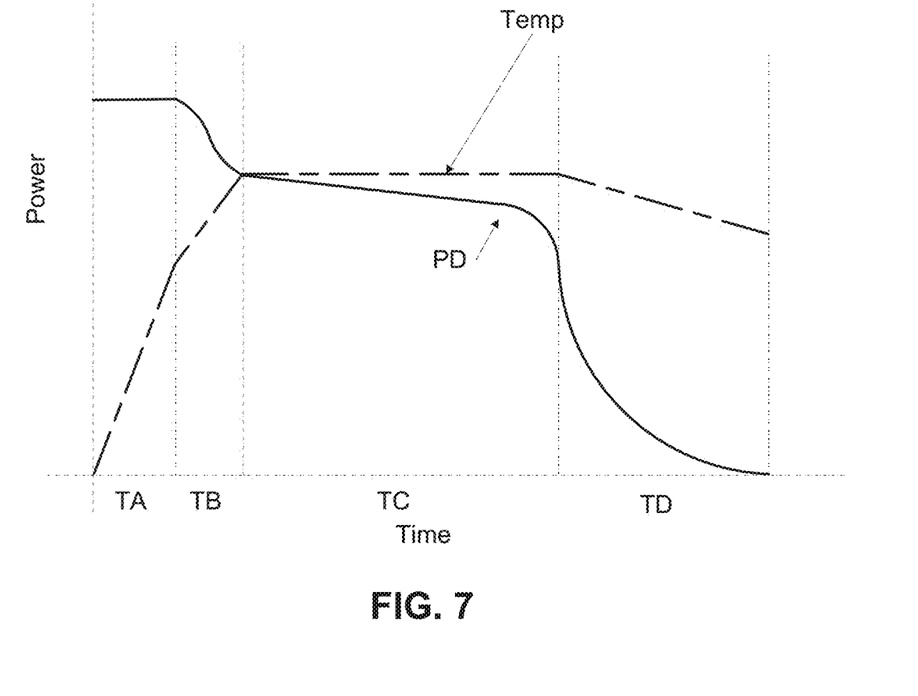
FIG. 7 shows a power setting v. time curve in further relation to temperature which can be implemented by the popper of FIG. 3.

FIG. 7 shows an exemplary power curve (solid line) with the temperature curve of FIG. 1 also shown (TEMP). As can be seen, the power is initially at the highest setting early on until the desired temperature TP is reached. As the desired temperature T2 is maintained within the appropriate range, the power required to maintain the temperature will decrease since popcorn is both popping and leaving the cooking vessel. In this manner, it can be inferred when the majority of popcorn is in fact popped based on knowing the applied power setting and the rate of decrease thereof in comparison to the temperature. For example, when 75% of kernels are popped, the power setting to maintain 400 degrees will be lower than if only 25% of the kernels were popped. Thus, when there is an increasing rate of power drop beyond a threshold level of what is anticipated, it can be inferred that most of the popcorn is done popping. The increasing rate of power drop is depicted by PD. Therefore, at this stage, the power setting is reduced and the temperature is allowed to drop. Residual heat will be used to cook the remaining kernels and the temperature will slowly decrease.

One of the challenges in cooking popcorn with traditional methods and in bags is that the un-popped kernels and the popped kernels are not adequately separated. Typically, at the bottom of the bag/container there is a collection of un-wanted partially and un-popped kernels. Although it may be possible to pop every kernel, doing so would ultimately burn some of the kernels.

The separation of the cooking and collection allows for the popped kernels to not be cooked further while ensuring that those which require longer cooking times/more heat can remain on the hot surface. The cooking processes described herein ensures that a great majority of the kernels are popped. For example, over greater than 90% is common with the present system and above 95% or even above 98% popped is achieved without significant burning or overcooking. Particularly, less than 3% may be overcooked and less than 1% burnt.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A popcorn popper which is configured to cook popcorn comprising:
    a vessel;
    a heating element which is electrically powered and which when activated heats the vessel;
    a vibration element which when activated vibrates said vessel;
    a controller which controls said heating element and said vibration element with software executing on said controller;
    a temperature sensor which is in communication with said controller such that said controller receives temperature readings from the temperature sensor indicative of a temperature of said vessel;
    said software activating said heating element to heat the vessel which contains the popcorn until the temperature sensor indicates that a first temperature has been reached;
    said software, based on readings from the temperature sensor, maintaining the vessel at a second temperature by controlling a power setting of said heating element to deliver power to said heating element during at least part of a time period while the second temperature is maintained;
    said software activating said vibration element to vibrate the vessel which thereby vibrates the popcorn;
    said software, after maintaining the vessel at the second temperature, reducing the power of said heating element.

2. The device of claim 1 wherein said software reduces the power of said heating element to allow for the vessel to reduce in temperature based on one or more of the group consisting of: a reading from the temperature sensor, a expiration of a time period, and reaching a threshold rate change in power required to maintain the second temperature.

3. The device of claim 1 wherein a first power setting to reach the first temperature is higher than a second power setting to reach the second temperature such that a first rate change of temperature prior to reaching the first temperature is higher than a second rate change of temperature after reaching the first temperature.

4. The device of claim 1 wherein the second temperature is a range of temperatures.

5. The device of claim 1 wherein said software reduces the power setting based on a period of time elapsing after the first temperature has been reached.

6. The device of claim 1 wherein said software reduces the power setting based on a rate change in power required for maintaining the second temperature.

7. The device of claim 6 wherein while maintaining the second temperature, the controller cycles the heating element on and off at least twice.

8. The device of claim 7 wherein the rate change in power required for maintaining the second temperature is based on an average power.

9. The device of claim 6 wherein the power setting is reduced when that power setting required to maintain the second temperature reduces.

10. The device of claim 9 wherein the power setting is reduced when that power setting required to maintain the second temperature reduces below a threshold value.

11. The device of claim 1 wherein the second temperature is a range of temperatures.

12. The device of claim 1 wherein the first temperature is a range of temperatures.

13. The device of claim 1 wherein the vibration element is switched between a cycle of activated and deactivated at least twice during the time period by the controller.

14. The device of claim 1 wherein the first and second temperatures are equal.

15. The device of claim 1 wherein after said software reduces the power setting of the heating element, the vibration element is activated.

16. The device of claim 1 wherein the vessel includes a ferrous material and the heating element includes an induction coil.

17. The device of claim 1 wherein the vessel is a cartridge comprising a ferrous and a non-ferrous material, the ferrous material in contact with the popcorn which is in the cartridge.

18. The device of claim 1 wherein said software determines an incoming voltage of an electrical power source to which the popcorn popper is connected and based on determining the incoming voltage adjusts a setting of the heating element to compensate for varied voltage sources.

19. The device of claim 1 wherein the software utilizes temperature readings taken when the vibration element is deactivated.

20. The device of claim 1 wherein said software activates said vibration element at least once during the time period during which said vessel is maintained at said second temperature.

21. A popcorn popper which is configured to cook popcorn comprising:
    a vessel;
    a heating element which is electrically powered and which when activated heats the vessel;
    a vibration element which when activated vibrates said vessel;
    a controller which controls said heating element and said vibration element;
    a temperature sensor which is in communication with said controller such that said controller receives temperature readings from the temperature sensor indicative of a temperature of said vessel;
    a selector in communication with said controller to activate the popcorn popper;
    software executing on said controller which upon receiving a selection from said selector activates said heating element to heat the vessel which contains the popcorn until the temperature sensor indicates a temperature is reached;
    said software, based on readings from the temperature sensor, maintaining the vessel at or within a range of the temperature by controlling a power setting of said heating element to deliver power to said heating element while the temperature is maintained;
    said software is configured to activate said vibration element at least once to vibrate the vessel which thereby vibrates the popcorn during a time period when the temperature is maintained;
    said software thereafter vibrating the vessel and simultaneously reducing the power of said heating element which allows the vessel to reduce in temperature.

22. The device of claim 21 wherein when vibrating and simultaneously reducing the power, the power is reduced to off.

* * * * *